(12) United States Patent
Pehlke

(10) Patent No.: US 12,526,751 B2
(45) Date of Patent: Jan. 13, 2026

(54) MULTIPLE ANTENNA TRANSMISSION TO MANAGE RADIATED POWER

(71) Applicant: Skyworks Solutions, Inc., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 614 days.

(21) Appl. No.: 17/966,571

(22) Filed: Oct. 14, 2022

(65) Prior Publication Data

US 2023/0119378 A1    Apr. 20, 2023

Related U.S. Application Data

(60) Provisional application No. 63/262,581, filed on Oct. 15, 2021.

(51) Int. Cl.
*H04W 52/30* (2009.01)
*H04W 16/14* (2009.01)

(52) U.S. Cl.
CPC .......... *H04W 52/30* (2013.01); *H04W 16/14* (2013.01)

(58) Field of Classification Search
CPC ..... H04W 52/30; H04W 16/14; H04W 52/38; H04W 52/346; H04W 52/367
See application file for complete search history.

(56) References Cited

U.S. PATENT DOCUMENTS

| | | | |
|---|---|---|---|
| 5,880,921 A | 3/1999 | Tham et al. | |
| 6,052,559 A * | 4/2000 | Buer | H03F 1/02 455/343.1 |
| 6,232,847 B1 | 5/2001 | Marcy et al. | |
| 6,445,261 B1 | 9/2002 | Yuda et al. | |
| 7,092,676 B2 | 8/2006 | Abdelgany et al. | |
| 7,286,028 B2 | 10/2007 | Kushitani et al. | |
| 7,502,625 B2 | 3/2009 | Beamish et al. | |
| 7,729,674 B2 | 6/2010 | Shie et al. | |
| 8,503,962 B2 | 8/2013 | Rafi et al. | |
| 8,723,620 B2 | 5/2014 | Nishimura et al. | |
| 9,190,957 B2 | 11/2015 | Marcy et al. | |
| 9,397,721 B2 | 7/2016 | Pehlke | |
| 9,418,950 B2 | 8/2016 | Zhang et al. | |
| 9,419,584 B2 | 8/2016 | Tsurunari et al. | |
| 9,572,052 B2 | 2/2017 | King et al. | |
| 9,680,416 B2 * | 6/2017 | Burgener | H10D 89/60 |
| 9,748,985 B2 | 8/2017 | Zhang et al. | |
| 9,748,992 B2 | 8/2017 | Pehlke | |
| 9,768,941 B2 | 9/2017 | Pehlke | |
| 9,866,268 B2 | 1/2018 | King et al. | |
| 9,866,366 B2 | 1/2018 | Pehlke | |
| 9,991,918 B2 | 6/2018 | King et al. | |
| 10,014,889 B2 | 7/2018 | King et al. | |

(Continued)

*Primary Examiner* — Dominic E Rego
(74) *Attorney, Agent, or Firm* — Knobbe, Martens, Olson & Bear, LLP

(57) ABSTRACT

Increased radiated power using multiple antennas is disclosed. In certain aspects, power spectral density limitations on a per antenna basis can be met while increasing radiated power for a shared channel by transmitting the signal over multiple antennas. Further aspects relate to allocating a monolithic block of modulation as a single cluster to minimize the required power back-off and maximize power density.

20 Claims, 11 Drawing Sheets

(56) References Cited

U.S. PATENT DOCUMENTS

| | | |
|---|---|---|
| 10,075,199 B2 | 9/2018 | King et al. |
| 10,177,838 B2 | 1/2019 | Ripley |
| 10,211,857 B2 | 2/2019 | King et al. |
| 10,256,851 B2 | 4/2019 | Pehlke et al. |
| 10,340,862 B2 | 7/2019 | Lehtola et al. |
| 10,340,961 B2 | 7/2019 | King et al. |
| 10,348,358 B1* | 7/2019 | Ramakrishnan ..... H04B 1/0483 |
| 10,374,555 B2 | 8/2019 | Pehlke et al. |
| 10,439,685 B2 | 10/2019 | Pehlke et al. |
| 10,447,317 B2 | 10/2019 | Chang et al. |
| 10,454,506 B2 | 10/2019 | King et al. |
| 10,484,025 B2 | 11/2019 | Zhang et al. |
| 10,554,294 B2 | 2/2020 | Ripley |
| 10,581,466 B2 | 3/2020 | Pehlke |
| 10,587,291 B2 | 3/2020 | Pehlke et al. |
| 10,644,861 B2 | 5/2020 | Pehlke |
| 10,659,121 B2 | 5/2020 | Pehlke |
| 10,666,300 B2 | 5/2020 | Wloczysiak et al. |
| 10,917,056 B2 | 2/2021 | Lehtola et al. |
| 10,951,173 B2 | 3/2021 | Pehlke et al. |
| 10,985,796 B2 | 4/2021 | Pehlke |
| 11,018,726 B2 | 5/2021 | Pehlke et al. |
| 11,026,189 B2* | 6/2021 | Vintola ............... H04L 5/0048 |
| 11,038,543 B2 | 6/2021 | Chang et al. |
| 11,128,323 B2 | 9/2021 | Pehlke et al. |
| 11,190,223 B2 | 11/2021 | Wloczysiak et al. |
| 11,309,926 B2 | 4/2022 | Zhang et al. |
| 11,336,325 B2 | 5/2022 | Pehlke |
| 11,349,504 B2 | 5/2022 | Pehlke |
| 11,368,179 B2 | 6/2022 | Pehlke |
| 11,374,538 B2 | 6/2022 | Drogi et al. |
| 11,405,059 B2 | 8/2022 | Pehlke |
| 11,469,798 B2 | 10/2022 | Pehlke |
| 11,605,887 B1* | 3/2023 | Sharma ............ H04B 7/18515 |
| 2002/0030545 A1* | 3/2002 | Hashemi ................ H03F 3/72 330/302 |
| 2002/0173337 A1* | 11/2002 | Hajimiri ................ H04B 1/28 455/552.1 |
| 2003/0066897 A1* | 4/2003 | Carner ............... G05D 23/1905 236/94 |
| 2003/0190895 A1* | 10/2003 | Mostov .................. H04B 1/04 455/73 |
| 2004/0192247 A1* | 9/2004 | Rotta ................... H03G 3/3042 455/343.1 |
| 2005/0227652 A1* | 10/2005 | Kang .................... H03F 3/24 455/194.2 |
| 2005/0231306 A1 | 10/2005 | Kushitani et al. |
| 2007/0155314 A1* | 7/2007 | Mohebbi ............ H04B 7/2606 455/11.1 |
| 2009/0325481 A1* | 12/2009 | Mohebbi ............ H04B 7/2606 455/15 |
| 2010/0233987 A1 | 9/2010 | Rafi et al. |
| 2012/0032753 A1 | 2/2012 | Nishimura et al. |
| 2012/0218052 A1 | 8/2012 | Tsurunari et al. |
| 2012/0287866 A1* | 11/2012 | Petrovic ............. H04L 12/2801 370/329 |
| 2013/0053089 A1* | 2/2013 | Hwang ................ H04W 52/04 455/127.2 |
| 2013/0273860 A1 | 10/2013 | Pehlke |
| 2013/0316662 A1* | 11/2013 | Bengtsson ........... H04B 7/0874 455/73 |
| 2014/0321339 A1 | 10/2014 | Pehlke |
| 2014/0323066 A1 | 10/2014 | Zhang et al. |
| 2014/0370832 A1 | 12/2014 | Marcy et al. |
| 2015/0373724 A1* | 12/2015 | Ibrahim ............... H04W 24/02 370/252 |
| 2016/0006556 A1 | 1/2016 | Pehlke et al. |
| 2016/0028432 A1* | 1/2016 | Zhang .................... H04B 1/006 455/83 |
| 2016/0044677 A1 | 2/2016 | King et al. |
| 2016/0094254 A1 | 3/2016 | Ripley |
| 2016/0127060 A1* | 5/2016 | Cross .................... H04W 52/52 375/211 |
| 2016/0134414 A1 | 5/2016 | Pehlke |
| 2016/0301437 A1 | 10/2016 | Pehlke |
| 2016/0352367 A1 | 12/2016 | Zhang et al. |
| 2016/0381641 A1* | 12/2016 | Shahar ................... H04W 4/80 455/522 |
| 2017/0026074 A1 | 1/2017 | King et al. |
| 2017/0093446 A1* | 3/2017 | Poulin ...................... H03F 3/68 |
| 2017/0111066 A1 | 4/2017 | King et al. |
| 2017/0111074 A1 | 4/2017 | King et al. |
| 2017/0317653 A1 | 11/2017 | Lehtola et al. |
| 2017/0324432 A1 | 11/2017 | Zhang et al. |
| 2017/0373730 A1 | 12/2017 | Pehlke et al. |
| 2018/0019768 A1 | 1/2018 | King et al. |
| 2018/0076774 A1 | 3/2018 | Pehlke et al. |
| 2018/0076834 A1 | 3/2018 | Wloczysiak et al. |
| 2018/0205530 A1 | 7/2018 | Pehlke |
| 2018/0294858 A1 | 10/2018 | Pehlke |
| 2018/0367173 A1 | 12/2018 | King et al. |
| 2019/0007073 A1 | 1/2019 | King et al. |
| 2019/0097661 A1 | 3/2019 | Chang et al. |
| 2019/0115946 A1 | 4/2019 | Pehlke |
| 2019/0123769 A1 | 4/2019 | Pehlke et al. |
| 2019/0123770 A1 | 4/2019 | Pehlke |
| 2019/0149178 A1 | 5/2019 | King et al. |
| 2019/0199434 A1 | 6/2019 | Ripley |
| 2019/0305804 A1 | 10/2019 | Pehlke et al. |
| 2019/0394733 A1* | 12/2019 | Yang ................... H04B 7/0404 |
| 2020/0083915 A1 | 3/2020 | Zhang et al. |
| 2020/0106463 A1 | 4/2020 | Chang et al. |
| 2020/0112348 A1 | 4/2020 | Pehlke et al. |
| 2020/0162029 A1 | 5/2020 | Pehlke et al. |
| 2020/0162039 A1 | 5/2020 | Lehtola et al. |
| 2020/0162114 A1 | 5/2020 | King et al. |
| 2020/0336110 A1 | 10/2020 | Drogi et al. |
| 2020/0358460 A1 | 11/2020 | Wloczysiak et al. |
| 2020/0412307 A1* | 12/2020 | Hitomi ................. H03F 1/0233 |
| 2020/0412403 A1 | 12/2020 | Pehlke |
| 2021/0028813 A1 | 1/2021 | Pehlke |
| 2021/0058124 A1 | 2/2021 | Pehlke |
| 2021/0092687 A1* | 3/2021 | Harrison ............ H04L 25/0226 |
| 2021/0119691 A1* | 4/2021 | Dash ..................... H04L 1/0003 |
| 2021/0135690 A1 | 5/2021 | Pehlke |
| 2021/0159956 A1* | 5/2021 | Weissman ............ H04B 7/0604 |
| 2021/0203376 A1 | 7/2021 | Pehlke |
| 2021/0211145 A1 | 7/2021 | Loh et al. |
| 2021/0218422 A1 | 7/2021 | Pehlke |
| 2021/0218424 A1 | 7/2021 | Pehlke |
| 2021/0218434 A1 | 7/2021 | Pehlke |
| 2021/0351810 A1* | 11/2021 | Gorbachov ............. H04B 1/04 |
| 2021/0400599 A1* | 12/2021 | Gopal ................. H04W 52/367 |
| 2022/0014252 A1* | 1/2022 | Harrison ............. H04B 7/0617 |
| 2022/0069846 A1 | 3/2022 | Loh et al. |
| 2022/0200639 A1 | 6/2022 | Sun et al. |
| 2022/0231710 A1 | 7/2022 | Pehlke |
| 2022/0247365 A1 | 8/2022 | Pehlke et al. |
| 2022/0278708 A1 | 9/2022 | Pehlke |
| 2022/0311469 A1 | 9/2022 | Brunel et al. |
| 2022/0329266 A1 | 10/2022 | Pehlke |
| 2022/0360227 A1* | 11/2022 | Khlat ................... H03F 1/0227 |

\* cited by examiner

MULTIPLE ANTENNA TRANSMISSION TO MANAGE RADIATED POWER

CROSS-REFERENCE TO RELATED APPLICATION(S)

Any and all applications for which a foreign or domestic priority claim is identified in the Application Data Sheet as filed with the present application are hereby incorporated by reference under 37 CFR 1.57.

BACKGROUND

Field

Embodiments of this disclosure relate to systems and methods for increasing radiated power using multiple antennas for transmission, particular, in unlicensed bands.

Description of the Related Technology

Cellular transmission using unlicensed bands are of interest for providing additional bandwidth for cellular communication. However, there are regulations for unlicensed bands which are not present for certain regulated bands. Some of these regulations may limit the power usable when using unlicensed bands. Thus, it is desirable to increase radiated power within the unlicensed bands while still meeting regulatory requirements.

SUMMARY

The innovations described in the claims each have several aspects, no single one of which is solely responsible for its desirable attributes. Without limiting the scope of the claims, some prominent features of this disclosure will now be briefly described.

Increased radiated power using multiple antennas is disclosed. In certain aspects, power spectral density limitations on a per antenna basis can be met while increasing radiated power for a shared channel by transmitting the signal over multiple antennas. Further aspects relate to allocating a monolithic block of modulation as a single cluster to minimize the required power back-off and maximize power density In one aspect, a radio frequency device comprises at least two transmit chains configured to transmit a radio frequency signal, wherein the transmitted radio frequency signal has a power less than a threshold power level at each of the transmit chains.

In some embodiments, each of the transmit chains comprises a power amplifier and an antenna.

In some embodiments, the device is configured to share an unlicensed band with one or more other radio frequency devices, each of the radio frequency devices configured to use a monolithic block of a spectrum of the unlicensed band.

In some embodiments, the device is implemented in a radio frequency front end.

In some embodiments, the device is implemented in a mobile device.

Another aspect is a method of using the device.

Yet another aspect is a radio frequency device comprising: at least two transmit chains configured to transmit a radio frequency signal, the transmitted radio frequency signal having a power less than a threshold power level at each of the transmit chains.

In some embodiments, each of the transmit chains includes a power amplifier and each of the transmit chains is coupled to a corresponding antenna.

In some embodiments, the device is configured to transmit the radio frequency signal over the at least two transmit chains when operating in an unlicensed band.

In some embodiments, the device is configured to share an unlicensed band with one or more other radio frequency devices, each of the radio frequency devices configured to use a monolithic block of a spectrum of the unlicensed band.

In some embodiments, at least one of the transmit chains is a WiFi transmit chain.

In some embodiments, a combined uplink power of the at least two transmit chains is greater than the threshold power level.

In some embodiments, the at least two transmit chains are further configured to transmit the radio frequency signal with less power back-off compared to a single transmit chain transmitting the radio frequency signal with a power less than the threshold power level.

In some embodiments, the at least two transmit chains include four transmit chains configured to transmit the radio frequency signal, the combined uplink power of the four transmit chains is about 6 dB greater than the threshold power level.

Still yet another aspect is a mobile device comprising: at least two antennas; and a radio frequency front end including at least two transmit chains configured to transmit a radio frequency signal via a corresponding one of the at least two antennas, the transmitted radio frequency signal has a power less than a threshold power level at each of the antennas.

In some embodiments, the mobile device is configured to transmit the radio frequency signal over the at least two transmit chains when operating in an unlicensed band.

In some embodiments, the mobile device is configured to share an unlicensed band with one or more other radio frequency devices, each of the radio frequency devices configured to use a monolithic block of a spectrum of the unlicensed band.

In some embodiments, at least one of the transmit chains is a WiFi transmit chain.

In some embodiments, a combined uplink power of the at least two transmit chains is greater than the threshold power level.

In some embodiments, the at least two transmit chains are further configured to transmit the radio frequency signal with less power back-off compared to a single transmit chain transmitting the radio frequency signal with a power less than the threshold power level.

In some embodiments, the at least two transmit chains include four transmit chains configured to transmit the radio frequency signal, the combined uplink power of the four transmit chains is about 6 dB greater than the threshold power level.

Another aspect is a method of using a radio frequency device comprising: receiving a radio frequency signal at each of at least two transmit chains of a radio frequency device; independently amplifying the radio frequency signals using each of the at least two transmit chains; and transmitting the amplified radio frequency signals via at least two antennas respectively coupled to the at least two transmit chains, each of the transmitted amplified radio frequency signals having a power less than a threshold power level at each of the antennas.

In some embodiments, the method further comprises transmitting the radio frequency signal over the at least two transmit chains when operating in an unlicensed band.

In some embodiments, the method further comprises sharing an unlicensed band with one or more other radio frequency devices, each of the radio frequency devices configured to use a monolithic block of a spectrum of the unlicensed band.

In some embodiments, at least one of the transmit chains is a WiFi transmit chain.

In some embodiments, the method further comprises transmitting the radio frequency signal via the at least two transmit chains with less power back-off compared to a single transmit chain transmitting the radio frequency signal with a power less than the threshold power level.

DETAILED DESCRIPTION

Figure 1:
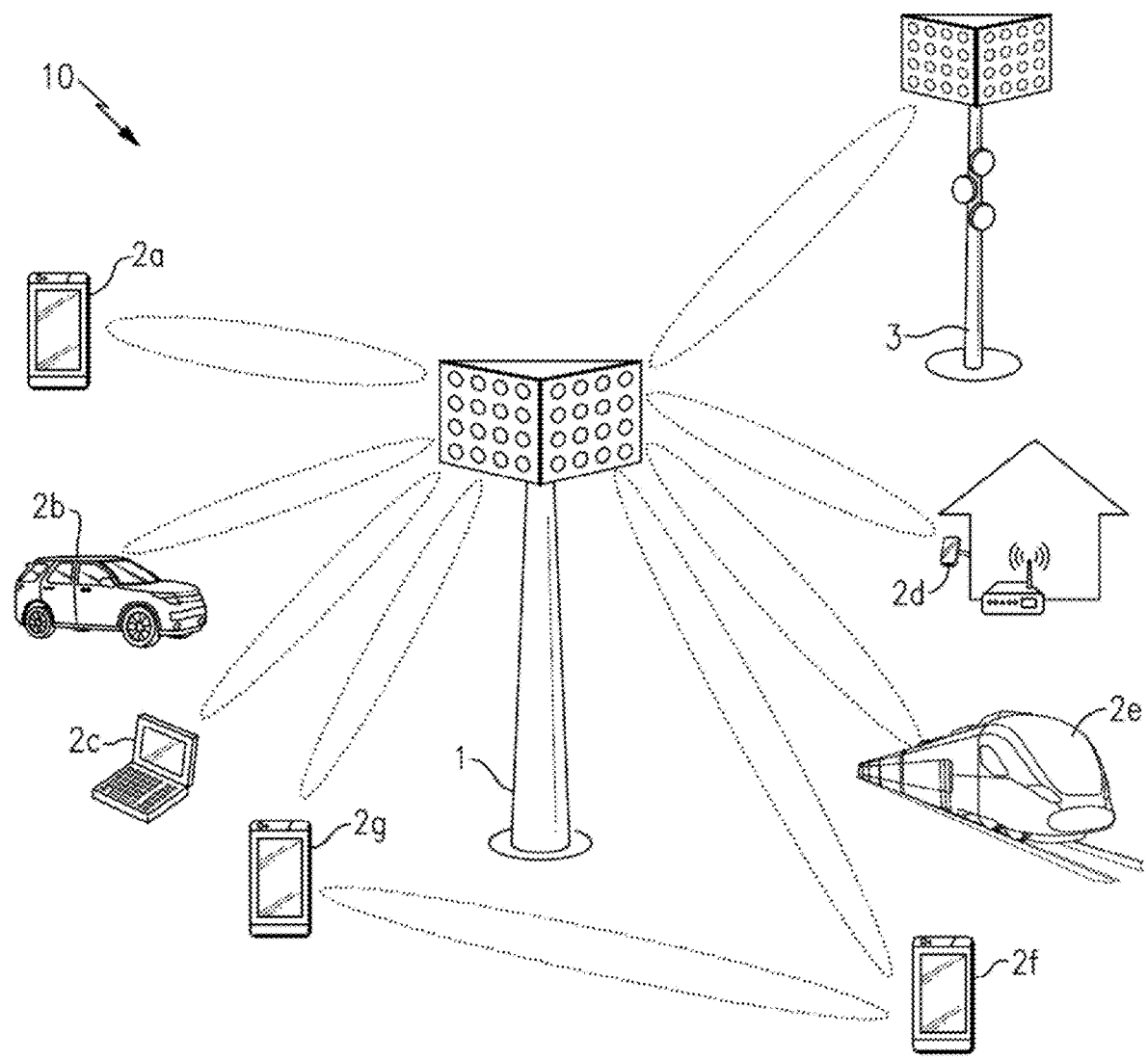
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Example Communication Networks and Wireless Communication Devices

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2020). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
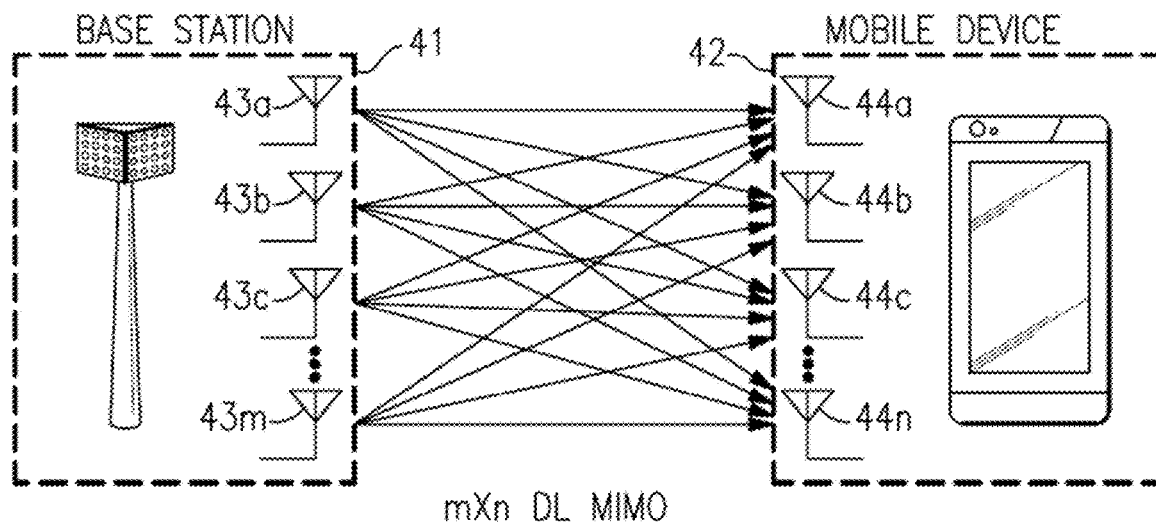
FIG. 2A is a schematic diagram of one example of a downlink channel using multi-input and multi-output (MIMO) communications.
Figure 2B:
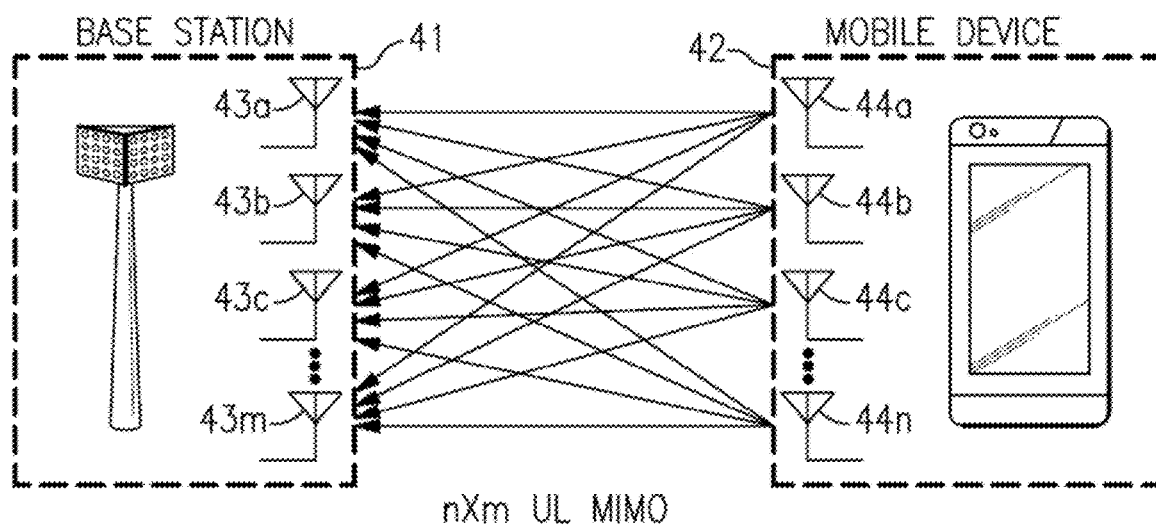
FIG. 2B is schematic diagram of one example of an uplink channel using MIMO communications.

FIG. 2A is a schematic diagram of one example of a downlink channel using multi-input and multi-output (MIMO) communications. FIG. 2B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 2A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 2A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 2B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 2B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 2C:
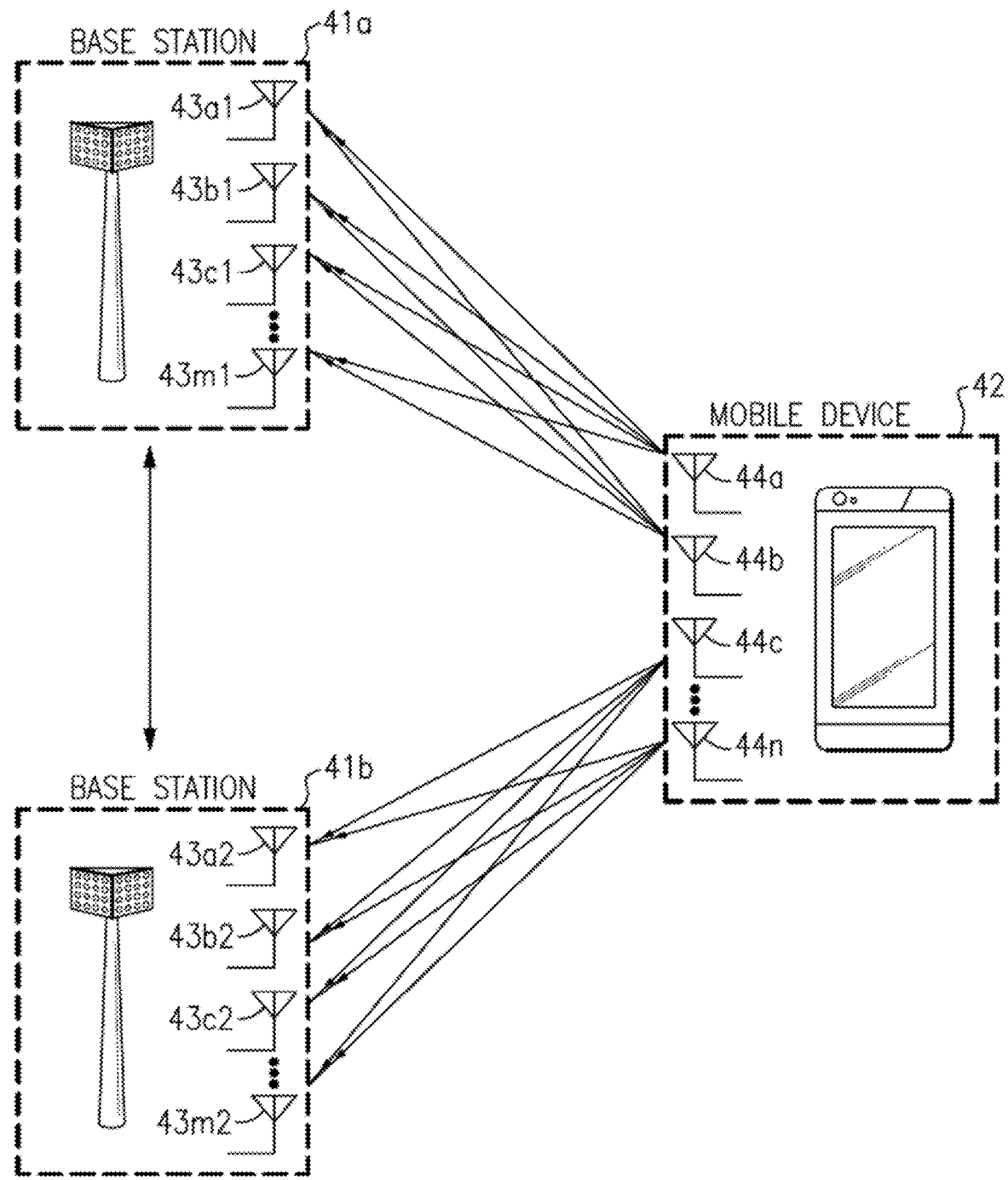
FIG. 2C is schematic diagram of another example of an uplink channel using MIMO communications.

FIG. 2C is schematic diagram of another example of an uplink channel using MIMO communications. In the example shown in FIG. 2C, uplink MIMO communications are provided by transmitting using N antennas 44a, 44b, 44c, . . . 44n of the mobile device 42. Additional a first portion of the uplink transmissions are received using M antennas 43a1, 43b1, 43c1, . . . 43m1 of a first base station 41a, while a second portion of the uplink transmissions are received using M antennas 43a2, 43b2, 43c2, . . . 43m2 of a second base station 41b. Additionally, the first base station 41a and the second base station 41b communication with one another over wired, optical, and/or wireless links.

The MIMO scenario of FIG. 2C illustrates an example in which multiple base stations cooperate to facilitate MIMO communications.

Figure 3:
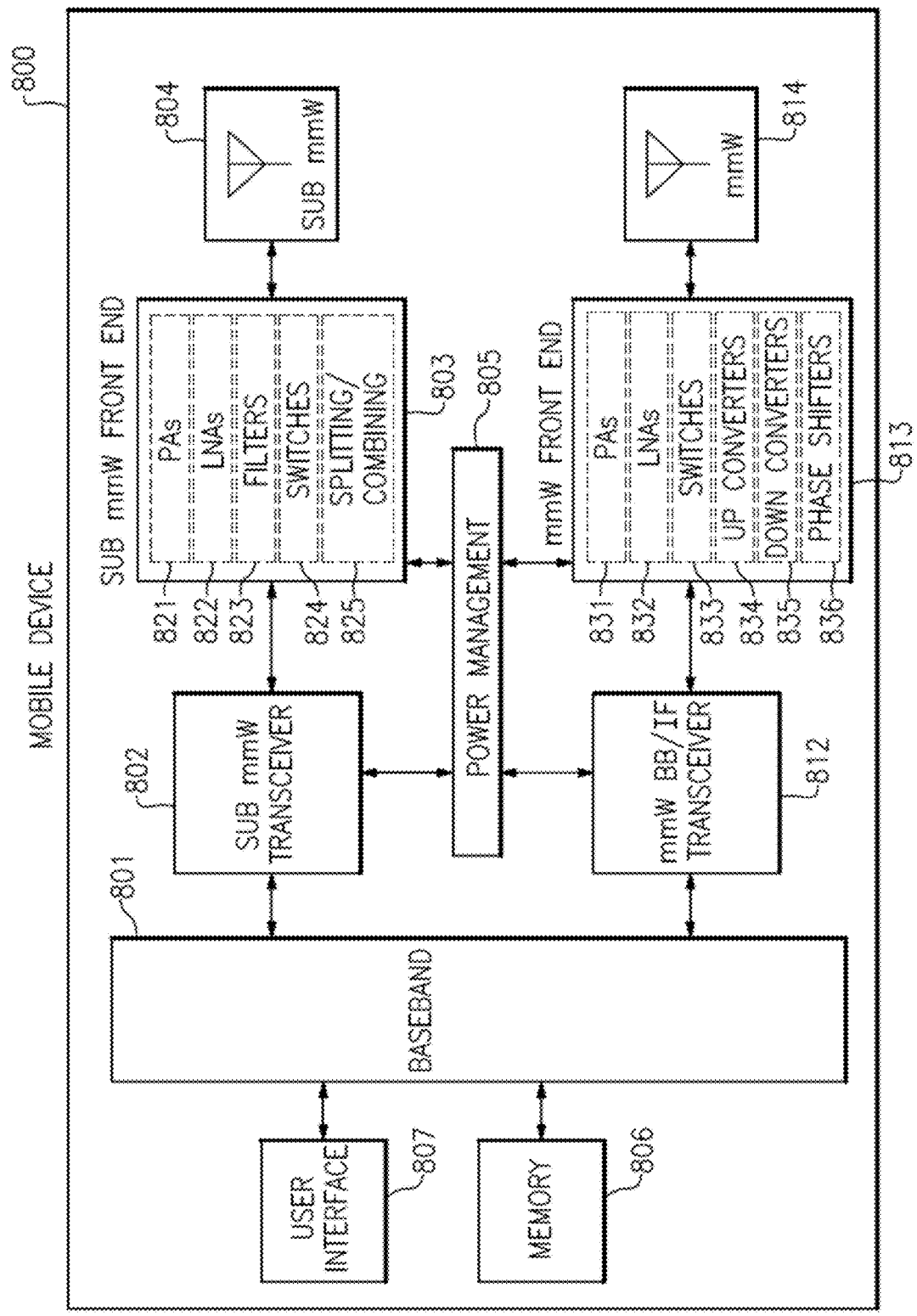
FIG. 3 is a schematic diagram of one embodiment of a mobile device.

FIG. 3 is a schematic diagram of one embodiment of a mobile device 800. The mobile device 800 includes a baseband system 801, a sub millimeter wave (mmW) transceiver 802, a sub mmW front end system 803, sub mmW antennas 804, a power management system 805, a memory 806, a user interface 807, a mmW baseband (BB)/intermediate frequency (IF) transceiver 812, a mmW front end system 813, and mmW antennas 814.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

In the illustrated embodiment, the sub mmW transceiver 802, sub mmW front end system 803, and sub mmW antennas 804 serve to transmit and receive centimeter waves and other radio frequency signals below millimeter wave frequencies. Additionally, the mmW BB/IF transceiver 812, mmW front end system 813, and mmW antennas 814 serve to transmit and receive millimeter waves. Although one specific example is shown, other implementations are possible, including, but not limited to, mobile devices operating using circuitry operating over different frequency ranges and wavelengths.

The sub mmW transceiver 802 generates RF signals for transmission and processes incoming RF signals received from the sub mmW antennas 804. It will be understood that various functionalities associated with the transmission and receiving of RF signals can be achieved by one or more components that are collectively represented in FIG. 3 as the sub mmW transceiver 802. In one example, separate components (for instance, separate circuits or dies) can be provided for handling certain types of RF signals.

The sub mmW front end system 803 aids is conditioning signals transmitted to and/or received from the antennas 804. In the illustrated embodiment, the front end system 803 includes power amplifiers (PAs) 821, low noise amplifiers (LNAs) 822, filters 823, switches 824, and signal splitting/combining circuitry 825. However, other implementations are possible.

For example, the sub mmW front end system 803 can provide a number of functionalizes, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The sub mmW antennas 804 can include antennas used for a wide variety of types of communications. For example, the sub mmW antennas 804 can include antennas for transmitting and/or receiving signals associated with a wide variety of frequencies and communications standards.

The mmW BB/IF transceiver 812 generates millimeter wave signals for transmission and processes incoming millimeter wave signals received from the mmW antennas 814. It will be understood that various functionalities associated with the transmission and receiving of RF signals can be achieved by one or more components that are collectively represented in FIG. 3 as the mmW transceiver 812. The mmW BB/IF transceiver 812 can operate at baseband or intermediate frequency, based on implementation.

The mmW front end system 813 aids is conditioning signals transmitted to and/or received from the mmW antennas 814. In the illustrated embodiment, the front end system 803 includes power amplifiers 831, low noise amplifiers 832, switches 833, up converters 834, down converters 835, and phase shifters 836. However, other implementations are possible. In one example, the mobile device 800 operates with a BB mmW transceiver, and up converters and down-converters are omitted from the mmW front end system. In another example, the mmW front end system further includes filters for filtering millimeter wave signals.

The mmW antennas 814 can include antennas used for a wide variety of types of communications. The mmW antennas 814 can include antenna elements implemented in a wide variety of ways, and in certain configurations the antenna elements are arranged to form one or more antenna arrays. Examples of antenna elements for millimeter wave antenna arrays include, but are not limited to, patch antennas, dipole antenna elements, ceramic resonators, stamped metal antennas, and/or laser direct structuring antennas.

In certain implementations, the mobile device 800 supports MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

In certain implementations, the mobile device 800 operates with beamforming. For example, the mmW front end system 803 includes amplifiers having controllable gain and phase shifters having controllable phase to provide beam formation and directivity for transmission and/or reception of signals using the mmW antennas 814. For example, in the context of signal transmission, the amplitude and phases of the transmit signals provided to an antenna array used for transmission are controlled such that radiated signals combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antenna array from a particular direction.

The baseband system 801 is coupled to the user interface 807 to facilitate processing of various user input and output (I/O), such as voice and data. The baseband system 801 provides the sub mmW and mmW transceivers with digital representations of transmit signals, which are processed by the transceivers to generate RF signals for transmission. The baseband system 801 also processes digital representations of received signals provided by the transceivers. As shown in FIG. 3, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers of the front end systems. For example, the power management system 805 can be configured to change the supply voltage(s) provided to one or more of the power amplifiers to improve efficiency, such as power added efficiency (PAE).

In certain implementations, the power management system 805 receives a battery voltage from a battery. The battery can be any suitable battery for use in the mobile device 800, including, for example, a lithium-ion battery.

Figure 4A:
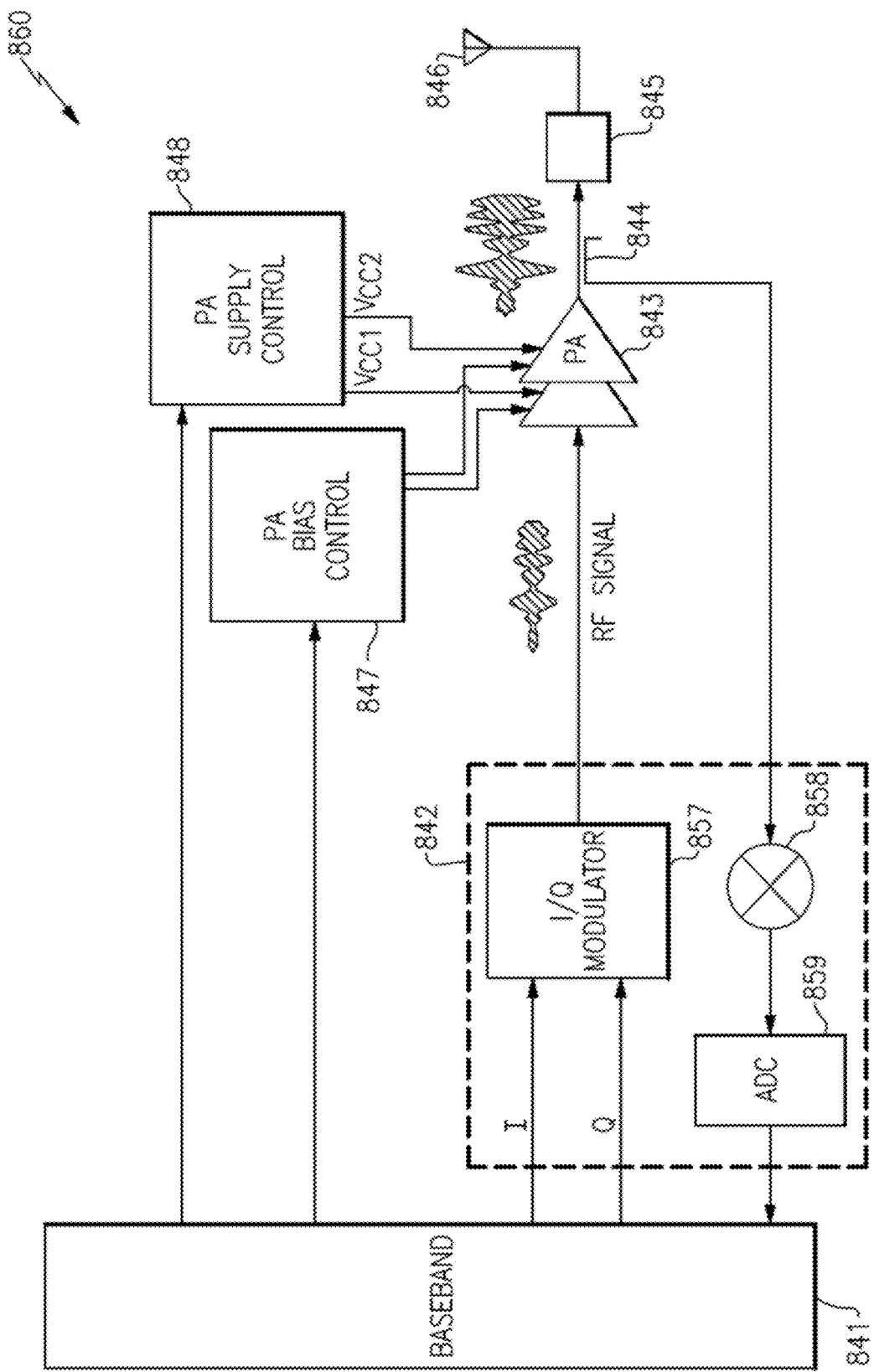
FIG. 4A is a schematic diagram of a power amplifier system according to one embodiment.

FIG. 4A is a schematic diagram of a power amplifier system 860 according to one embodiment. The illustrated power amplifier system 860 includes a baseband processor 841, a transmitter/observation receiver 842, a power amplifier (PA) 843, a directional coupler 844, front-end circuitry 845, an antenna 846, a PA bias control circuit 847, and a PA supply control circuit 848. The illustrated transmitter/observation receiver 842 includes an I/Q modulator 857, a mixer 858, and an analog-to-digital converter (ADC) 859. In certain implementations, the transmitter/observation receiver 842 is incorporated into a transceiver.

The baseband processor 841 can be used to generate an in-phase (I) signal and a quadrature-phase (Q) signal, which can be used to represent a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals can be provided to the I/Q modulator 857 in a digital format. The baseband processor 841 can be any suitable processor configured to process a baseband signal. For instance, the baseband processor 841 can include a digital signal processor, a microprocessor, a programmable core, or any combination thereof. Moreover, in some implementations, two or more baseband processors 841 can be included in the power amplifier system 860.

The I/Q modulator 857 can be configured to receive the I and Q signals from the baseband processor 841 and to process the I and Q signals to generate an RF signal. For example, the I/Q modulator 857 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 843. In certain implementations, the I/Q modulator 857 can include one or more filters configured to filter frequency content of signals processed therein.

The power amplifier 843 can receive the RF signal from the I/Q modulator 857, and when enabled can provide an amplified RF signal to the antenna 846 via the front-end circuitry 845.

The front-end circuitry 845 can be implemented in a wide variety of ways. In one example, the front-end circuitry 845 includes one or more switches, filters, duplexers, multiplexers, and/or other components. In another example, the front-end circuitry 845 is omitted in favor of the power amplifier 843 providing the amplified RF signal directly to the antenna 846.

The directional coupler 844 senses an output signal of the power amplifier 823. Additionally, the sensed output signal from the directional coupler 844 is provided to the mixer 858, which multiplies the sensed output signal by a reference signal of a controlled frequency. The mixer 858 operates to generate a downshifted signal by downshifting the sensed output signal's frequency content. The downshifted signal can be provided to the ADC 859, which can convert the downshifted signal to a digital format suitable for processing by the baseband processor 841. Including a feedback path from the output of the power amplifier 843 to the baseband processor 841 can provide a number of advantages. For example, implementing the baseband processor 841 in this manner can aid in providing power control, compensating for transmitter impairments, and/or in performing digital pre-distortion (DPD). Although one example of a sensing path for a power amplifier is shown, other implementations are possible.

The PA supply control circuit 848 receives a power control signal from the baseband processor 841, and controls supply voltages of the power amplifier 843. In the illustrated configuration, the PA supply control circuit 848 generates a first supply voltage $V_{CC1}$ for powering an input stage of the power amplifier 843 and a second supply voltage $V_{CC2}$ for powering an output stage of the power amplifier 843. The PA supply control circuit 848 can control the voltage level of the first supply voltage $V_{CC1}$ and/or the second supply voltage $V_{CC2}$ to enhance the power amplifier system's PAE.

The PA supply control circuit 848 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 848 is a multi-mode supply control circuit that can operate in multiple supply control modes including an APT mode and an ET mode. For example, the power control signal from the baseband processor 841 can instruct the PA supply control circuit 848 to operate in a particular supply control mode.

As shown in FIG. 4A, the PA bias control circuit 847 receives a bias control signal from the baseband processor 841, and generates bias control signals for the power amplifier 843. In the illustrated configuration, the bias control circuit 847 generates bias control signals for both an input stage of the power amplifier 843 and an output stage of the power amplifier 843. However, other implementations are possible.

Figure 4B:
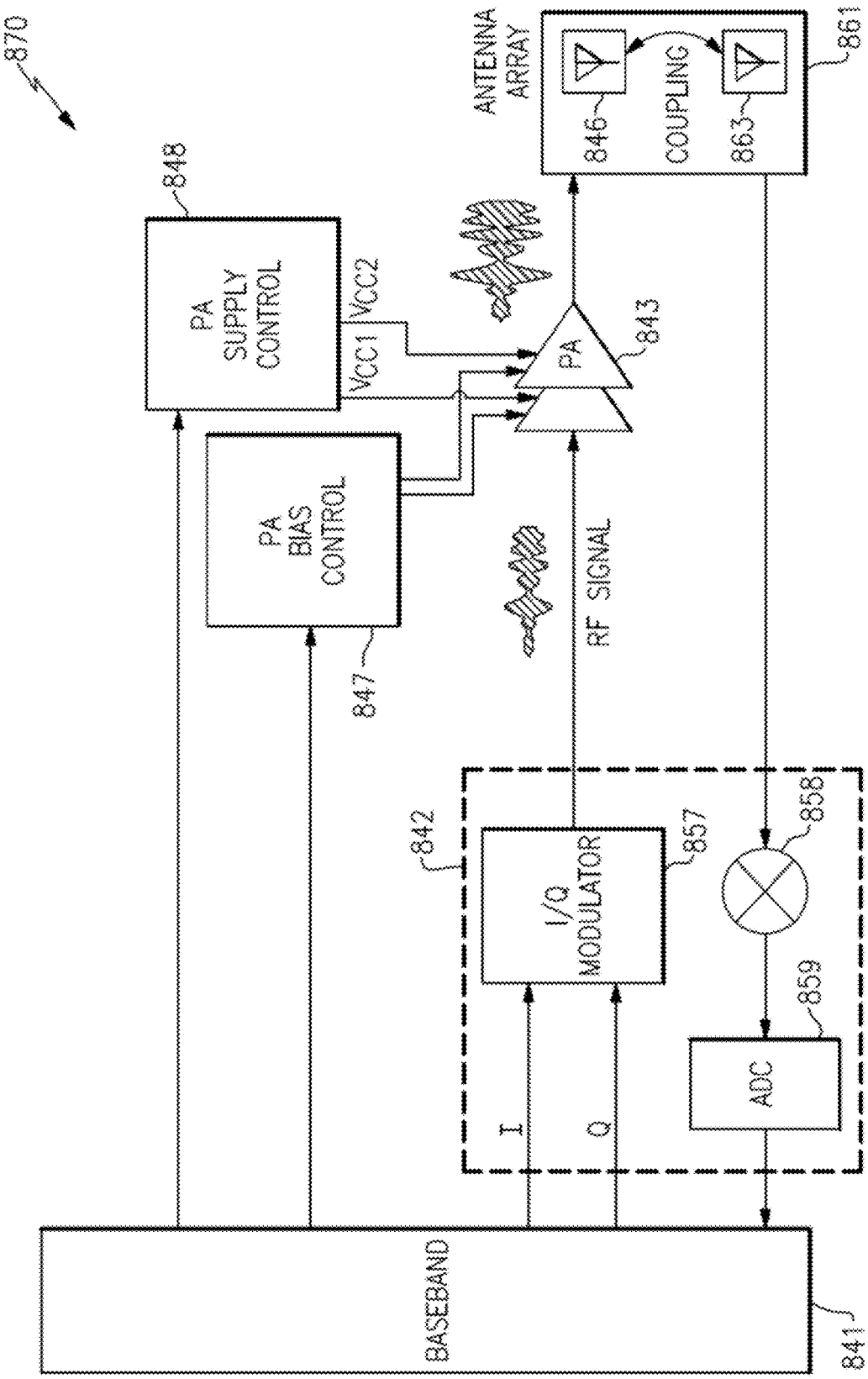
FIG. 4B is a schematic diagram of a power amplifier system according to another embodiment.

FIG. 4B is a schematic diagram of a power amplifier system 870 according to another embodiment. The illustrated power amplifier system 870 includes a baseband processor 841, a transmitter/observation receiver 842, a power amplifier 843, an antenna array 861, a PA bias control circuit 847, and a PA supply control circuit 848. As shown in FIG. 4B, the antenna array 861 includes an antenna 861 and an observation antenna 863.

The power amplifier system 870 of FIG. 4B is similar to the power amplifier system 860 of FIG. 4A, except that the power amplifier system 870 omits the directional coupler 844 and the front-end circuitry 845 of FIG. 4A to avoid loading loss at the output of the power amplifier 843. For example, the power amplifier system 870 can aid in providing low signal loss when transmitting at millimeter wave frequencies. As shown in FIG. 4B, the observation antenna 863 is coupled to the antenna 861 by antenna-to-antenna coupling, and serves to provide an observation signal for the observation path of the transmitter/observation receiver 842.

Examples of Increased Radiated Power Using Multiple Antennas

The importance of WiFi and unlicensed cellular features (e.g., licensed assisted access (LAA) in LTE and NR-unlicensed (NR-U) for 5G) in the shared unlicensed bands for cellular communications has been increasing. This has led to cellular communications increasingly incorporating inter-radio access technology (inter-RAT) considerations. Standardization of cellular use of these types of unlicensed bands with shared fair use protocols like listen-before-talk (LBT), etc., have paved the way for a strong shared use of these communication technologies.

In unlicensed bands, there are some regional regulatory restrictions that limit the maximum in-burst RMS uplink power for conducted measurement to specific limits measured in dBm/MHz. These regulatory restrictions may be more constraining than the cellular RAT.

Figure 5:
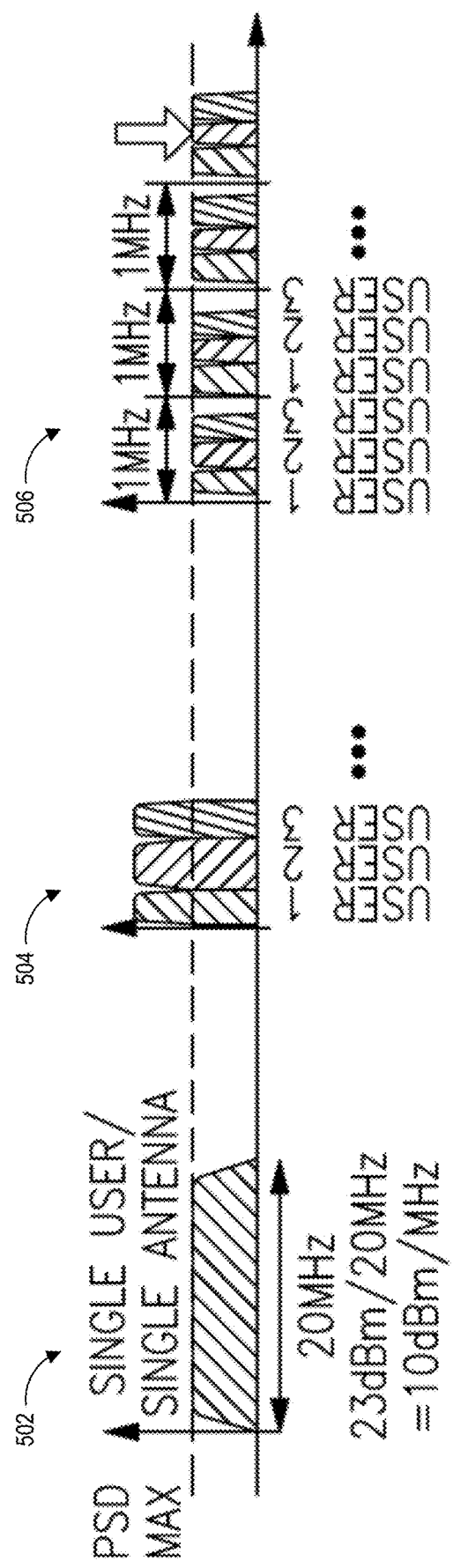
FIG. 5 provides three graphs illustrating the allocation of a channel for one or more users.

FIG. 5 illustrates example regional restrictions that may apply to unlicensed cellular bands in accordance with aspects of this disclosure. In particular, FIG. 5 provides three graphs illustrating the allocation of a channel for one or more users.

With reference to FIG. 5, a first allocation 502 shows a typical full channel allocation for a single user/single antenna. The full 20 MHz channel is allocated to the single user with the power below $PSD_{MAX}$ over the entire channel. When a single user is using a given channel without needing to share with other users, the full channel can be allocated to the user as shown in the first allocation 502. In this example, the channel is a 20 MHz band with a mean power density of 23 dBm over the 20 MHz band. This provides a mean power density of 10 dBm/MHz. In certain regional regulatory restrictions, the maximum mean power density (PSD MAX) may be 10 dBm in any 1 MHz band. However, other regulatory restrictions may be preset in other regions, and thus, the particular example values described above may be varied in order to meet the applicable regulatory restrictions.

The second allocation 504 illustrated in FIG. 5 provides a desired partial or shared allocation for a plurality of users (e.g., user 1, user 2, user 3, . . . ). As shown in FIG. 5, each user may be allocated a certain band of frequencies of the channel. In order to provide sufficient power for reliable cellular communication, it may be desirable to use more uplink power than the maximum mean power density defined by the applicable regulatory restriction. As shown in the figure, if each user transmits at the desired power of 23 dB, the transmit power exceeds the $PSD_{MAX}$ limit which may not meet regional regulations for unlicensed bands.

The third allocation 506 illustrates an example allocation of the channel between three users which complies with the maximum mean power density defined by the applicable regulatory restriction. For example, each 1 MHz band of the channel can be shared between the three users, with the uplink power for each user being less than the maximum mean power density for any 1 MHz band (e.g., less than 10 dBm/MHz in certain implementations). This allows the combined uplink power for each user to be increased, while still meeting the maximum mean power density per MHz band. In this case, a spread allocation over partial allocation/1 MHz is provided to keep the transmit power below the $PSD_{MAX}$ limit with shared channel between the users. In other words, each 1 MHz can be shared between the users.

Figure 6:
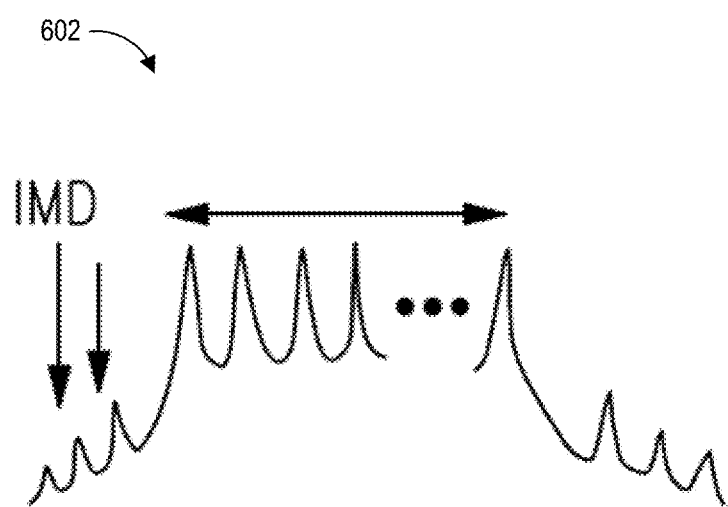
FIG. 6 illustrates intermodulation distortion (IMD) for allocation of a shared channel.

Thus, in one example power is decreased to remain below the $PSD_{MAX}$ (e.g., divided by the number of users such that e.g., 4 users limits to 17 dBm total and 10 dBm/MHz). Further the concentrated non-contiguous modulation clusters produce IMD as shown in FIG. 6 and discussed below. This may require significant power back-off to meet out of channel emissions limits (e.g., up to 16 dB additional back-off).

A summary of 3GPP defined restrictions for aspects of the regional regulatory restrictions are summarized in the excerpt below from 3GPP:

For E-UTRA CA bands including an uplink LAA Scell in Band 46, the UE shall meet the following additional requirements for transmission within the frequency ranges 5150-5350 MHz and 5470-5725 MHz:
 a maximum mean power density of 10 dBm in any 1 MHz band when the network signaling value NS_28 or NS_29 is indicated in the LAA Scell;
 a maximum mean power density of 11 dBm in any 1 MHz band when the network signaling value NS_30 is indicated in the LAA Scell;
 the following additional requirements for transmission within the frequency range 5230-5250 MHz:
 a maximum mean power density of 4 dBm in any 1 MHz band when the network signaling value NS_31 is indicated in the LAA Scell;
 the following additional requirements for transmission within the frequency ranges 5150-5230 MHz, 5250-5350 MHz, 5470-5725 MHz and 5725-5850 MHz:
 a maximum mean power density of 10 dBm in any 1 MHz band when the network signaling value NS_31 is indicated in the LAA Scell;
 where the said network signaling values are specified in clause 6.2.4.

Despite the regional power spectral density (PSD) restrictions for unlicensed bands, full allocation for the channel typically spreads the total power over enough bandwidth that the PSD is maintained below this limit. However, it may be especially difficult to meet this power restriction when the flexible modulation allocations of cellular technologies (which are normally allowed to concentrate the maximum uplink transmit power in ever shrinking frequency spans to improve power spectral density (PSD) and the Signal-to-Noise ratio (SNR) when received at the basestation for coverage and cell-edge performance considerations) can no long be applied due to the limitation of the PSD (e.g., to <=10 dBm/MHz in Europe in certain frequency ranges, etc.).

Certain solutions for the partial allocation challenge are to split up the power into 1 MHz bins and prescribe the maximum power for a partial concentrated allocation within that 1 MHz span, and then fill up the resource allocations remaining for use by other users within the cell. As shown in the third allocation 506 of FIG. 5, this produces highly concentrated PSD within many 1 MHz bins. In addition, the resulting amplification through the nonlinear power amplifier (PA) and other nonlinear blocks of the RF front-end transmitter may produce undesired and highly concentrated in-channel and out-of-channel emissions that are likely to fail regulatory emissions requirements. For example, FIG. 6 illustrates the emissions 602 for an example amplified signal that may produce IMD due to the nonlinear PA or other RF front-end blocks that can result in undesirable in-channel or out-of-channel emissions.

In order to solve this challenge, additional power back-off may be allowed to meet the emissions requirements (e.g., up to 16 dB of power back-off in some cases). The partial allocation and sharing of the channel across n users already limits the total power in that channel to $PSD_{MAX}$-10 log 10(n)->(e.g., 3 dB lower power for 2 users, 6 dB lower power for 4 users, etc.). Further, due to the channel being split up into 1 MHz non-contiguous clusters of separate modulation, there is additional power back-off required to meet emission requirements. These two factors can significantly limit the total uplink power, and therefore the total coverage range of this uplink limited communication service.

Aspects of this disclosure provide systems and techniques for increasing the amount of power while still meeting the $PSD_{MAX}$ limit by transmitting the same data from multiple antennas. In order to meet the regional restrictions, the limitation to conducted power/MHz has to be met at each individual antenna. Thus, by transmitting from two antennas, the user can transmit a 3 dB higher total power from the UE. Similarly, by transmitting from four antennas, the user can transmit 6 dB more total power.

The nTx coherent transmission proposed for LTE and NR in licensed bands enables Tx diversity gain of 1-2 dB that can further improve the SNR of the desired signal at the basestation. This can be important for extending range within the regulatory requirement imposed on each individual conducted antenna measurement. A common implementation for the cellular uplink in these shared bands is to re-use the existing WiFi transmit RF paths of those bands, as the WiFi transmit paths: are typically at a 100% attach rate in the UE solution, meet more stringent linearity and spectral mask/EVM requirements, and are already architected into supporting antenna interfaces for the overall radio solution.

One shortcoming of the WiFi hardware is typically the RMS power capability, which is typically defined for much higher peak-to-average ratios and can support lower peak-to-average cellular modulations at slightly higher power given the extra headroom. The use cases for providing a local wireless hotspot for WiFi services and screen mirroring typically require 2×2 UL-MIMO capability already within the WiFi solution, making multiple antenna measurements for the cellular shared use in the band that much more directly achievable at low cost and additional hardware burden.

Further aspects of this disclosure provide for modulation clustering in which a monolithic block of modulation is allocated as a single cluster to reduce the required power back-off and increase power density. This may be advantageous over non-contiguous allocations within each 1 MHz range.

Aspects of this disclosure relate to overcoming the uplink PSD regulatory limits through multiple antenna transmission. This approach can enable 10*log 10(m) more power from the UE for a given arrangement of m Tx-capable antennas. Further embodiments may also include the re-use of the nearby 2.4 GHz WiFi band(s) (e.g., B40 2300-2400 MHz, B41 2496-2690 MHz) and/or the 5 GHz WiFi band (n79 4400-5000 MHz) with: 1) a filter appropriate for the specific unlicensed band, and/or 2) a simple bypass and harmonic or other light bandpass filtering that would enable emissions and CA/EN-DC requirements to be met for the additional transmission from additional cellular RF hardware already available in the cellular front-end for this specific unlicensed feature support.

As described above, single antenna transmission may be limited by regional regulatory power spectral density limitations. For NS_28 and NS_29 in Europe (5150-5350 MHz)

$P_{MAX}$ is limited to less than 10 dBm/MHz. For NS_30 in the United States (5150-5725 MHz) $P_{MAX}$ is limited to less than 11 dBm/MHz.

Figure 7:
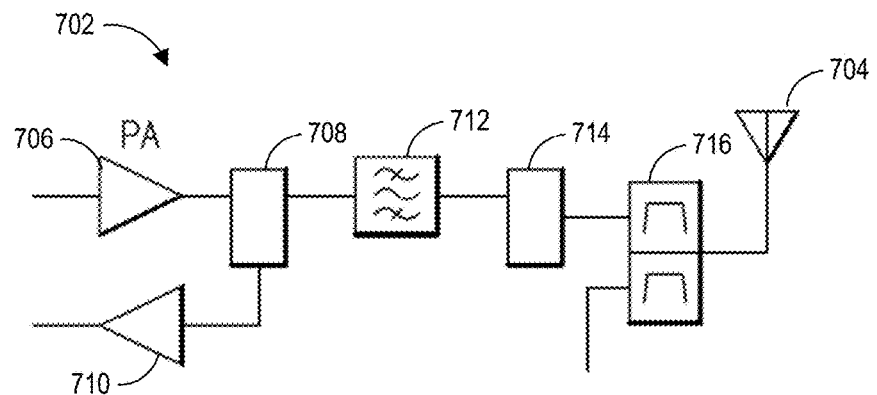
FIG. 7 illustrates a single transmit chain and single antenna.

As described above, uplink power for a single antenna is limited by regional regulations to below $PSD_{MAX}$. FIG. 7 illustrates a single transmit chain 702 and single antenna 704 in accordance with aspects of this disclosure. With reference to FIG. 7, the transmit chain 702 includes a power amplifier 706, a splitter/combiner 708, a low noise amplifier (LNA) 710, a filter 712, a switch 714, and a diplexer 716. Although FIG. 7 illustrates a particular embodiment of a transmit chain 702, other implementations are possible without departing from aspects of this disclosure.

Figure 8:
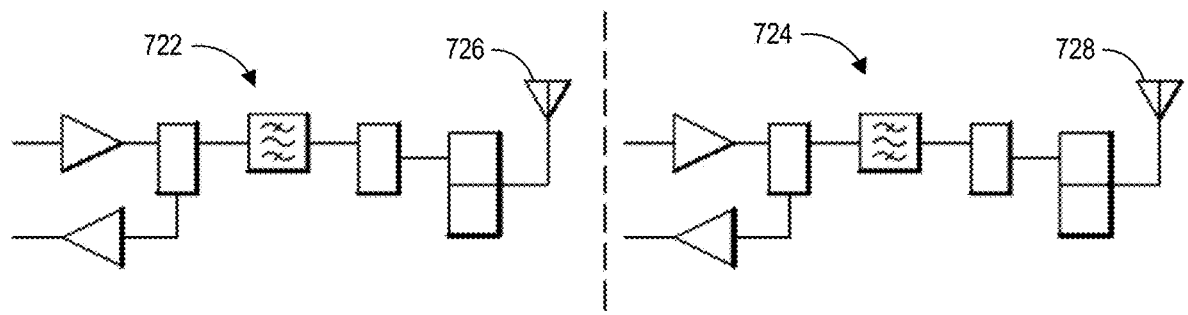
FIG. 8 illustrates two transmit chains respectively coupled to two antennas.

FIG. 8 illustrates two transmit chains 722 and 724 respectively coupled to two antennas 726 and 728 which can be used to increase total power of a transmit signal and reduce power back-off in accordance with aspects of this disclosure. The two transmit chains 722 and 724 two antennas 726 and 728 can be included in the same user equipment and can be configured to transmit the same radio frequency signal to increase total power of the radio frequency signal and reduce power back off. In certain embodiments, each of the transmit chains 722 and 724 may be implemented in the same manner as the signal transmit chain 702 of FIG. 7.

In certain embodiments, each of the transmit chains 722 and 724 can be configured to transmit the same radio frequency signal such that the uplink power measured at each transmit chain 722 and 724 individually is maintained below $PSD_{MAX}$. While the transmission from each antenna 722 and 724 is maintained below $PSD_{MAX}$, the total power of the radio frequency transmit signal can be increased by 3 dB by using two transmit chains 722 and 724 coupled to two antennas 726 and 728.

In various embodiments, this technique can be applied to two or more antennas/transmit chains. For example, two antennas 726 and 728 can be used as shown in FIG. 8, four transmit antennas can be used in some implementations, or any other combination of multiple antennas can be used to increase the uplink power and reduce power back off as described herein.

In addition, the coherent transmission of the RF transmit signal from multiple channels can use power up to the individual limit for each antenna, thereby increasing the total power by using a greater number of antennas. By transmitting from two antennas, the total power can increase 3 dB compared to using a single antenna. By transmitting from four antennas, the total power can increase 6 dB compared to using a single antenna.

Figure 9:
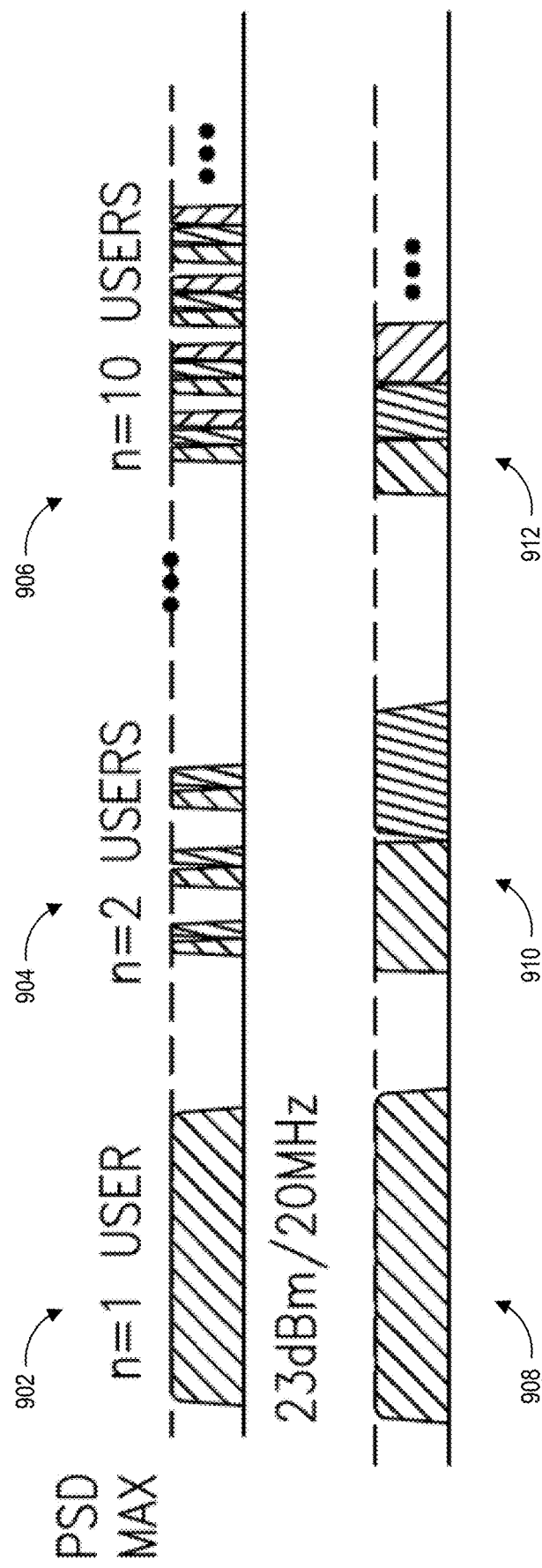
FIG. 9 illustrates how a channel can be shared between one or multiple users.

FIG. 9 illustrates an embodiment of sharing a channel between one or multiple users in accordance with aspects of this disclosure. In particular, the top row of FIG. 9 includes a first allocation 902 for a single user, a second allocation 904 for two users, and a third allocation 906 for ten users. The first, second, and third allocations 902-906 illustrate how the channel can be shared between users when each user equipment uses a single antenna.

The bottom row of FIG. 9 includes a fourth allocation 908 for a single user, a fifth allocation 910 for two users, and a sixth allocation 912 for ten users when multiple antennas are used in accordance with aspects of this disclosure. In contrast to the single antenna allocations, when allocating the channel as shown on the bottom row, monolithic blocks of the spectrum can be maintained. In other words, rather than splitting the channel into 1 MHz bands as in allocations 904 and 906 (or allocation 506 of FIG. 5), the channel can be split into monolithic (or contiguous) bands which are then assigned to the individual users. This can type of monolithic allocation can also reduce the required power back-off and increase power density compared to other techniques. Referring again to FIG. 8, where the two transmit chains 722 and 724 and two antennas 726 and 728 are included in the same user equipment (e.g., smart phone), the two transmit chains 722 and 724 can be configured to transmit the same radio frequency signal to increase total power of the radio frequency signal and reduce power back off. For example, referring to both FIG. 8 and the bottom row in FIG. 9, the two transmit chains 722 and 724 can be configured to transmit the same radio frequency signal using the respective antennas 726 and 728 within one of the monolithic blocks assigned to the user equipment including the two transmit chains 722 and 724, such that the uplink power measured at each transmit chain 722 and 724 individually is maintained below $PSD_{MAX}$. As two examples, if there are two users assigned to the channel, the transmit chains 722 and 724 can transmit at a frequency within one of the monolithic blocks 910 of the middle group in the bottom row of FIG. 9, and if there are ten users assigned to the channel, the transmit chains 722 and 724 can transmit at a frequency within one of the narrower monolithic blocks 912 of the rightmost group in the bottom row of FIG. 9.

As discussed, additional transmit chains and corresponding antennas (e.g., four or more) can be used in other embodiments, to increase the uplink power and reduce power back off. For instance, referring again to FIG. 2B, the mobile device 42 can be configured to transmit with separate transmit chains corresponding to some or all of the antennas 44a-44n within a monolithic frequency block assigned to the mobile device 42 within a channel. The base station 41 can be configured to receive the transmitted signals using any number of the antennas 43a-43m. Moreover, the base station 41 can be configured to receive corresponding signals, using any number of the antennas 43a-43m, from one or more additional mobile devices. The additional mobile device(s), like the mobile device 42, can each transmit using separate transmit chains/antennas within monolithic frequency blocks assigned to the additional mobile device(s) within the channel, such as in the manner shown in the bottom row of FIG. 9, where each mobile device is assigned to a different monolithic block within the channel.

Figure 10:
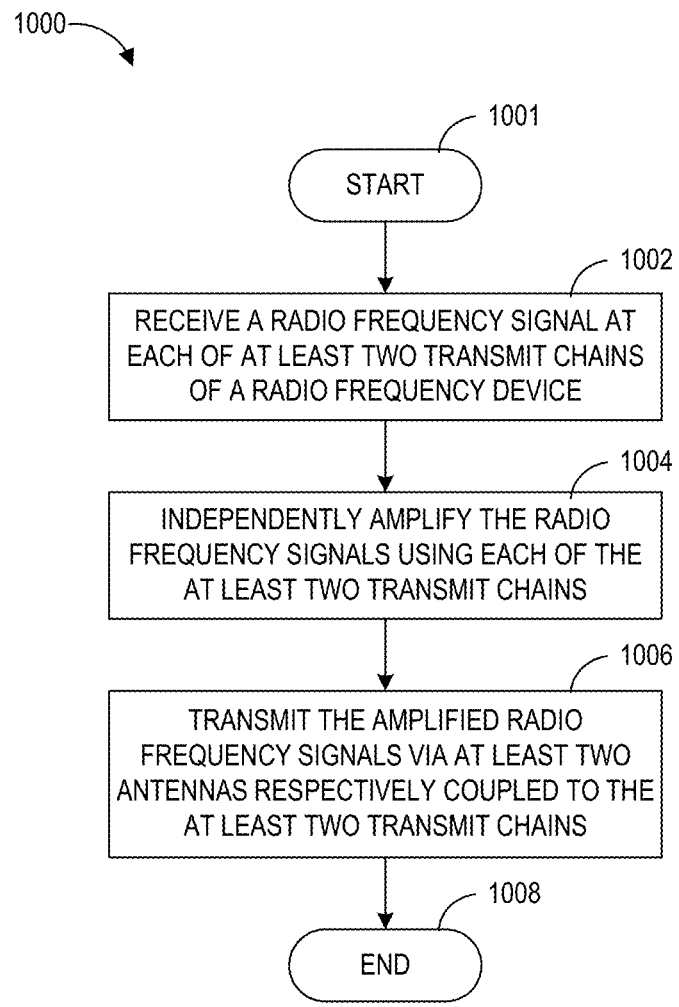
FIG. 10 is a flowchart illustrating a method of operating a radio frequency device in unlicensed bands with increased total power of the transmitted signal and reduced power back-off in accordance with aspects of this disclosure.

FIG. 10 is a flowchart illustrating a method of operating a radio frequency device in unlicensed bands with increased total power of the transmitted signal and reduced power back-off in accordance with aspects of this disclosure.

With reference to FIG. 10, the method 1000 starts at block 1001. At block 1002, the method 1000 involves receiving a radio frequency signal at each of at least two transmit chains of a radio frequency device. At block 1004, the method 1000 involves independently amplifying the radio frequency signals using each of the at least two transmit chains. At block 1006, the method 1000 involves transmitting the amplified radio frequency signals via at least two antennas respectively coupled to the at least two transmit chains. Each of the transmitted amplified radio frequency signals may have a power less than a threshold power level at each of the antennas. The method 1000 ends at block 1008.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a stereo system, a digital music player, a radio, a camera such as a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context indicates otherwise, throughout the description and the claims, the words "comprise," "comprising," "include," "including" and the like are to generally be construed in an inclusive sense, as opposed to an exclusive or exhaustive sense; that is to say, in the sense of "including, but not limited to." Conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

While certain embodiments have been described, these embodiments have been presented by way of example only, and are not intended to limit the scope of the disclosure. Indeed, the novel resonators described herein may be embodied in a variety of other forms. Furthermore, various omissions, substitutions and changes in the form of the resonators described herein may be made without departing from the spirit of the disclosure. Any suitable combination of the elements and/or acts of the various embodiments described above can be combined to provide further embodiments. The accompanying claims and their equivalents are intended to cover such forms or modifications as would fall within the scope and spirit of the disclosure.

What is claimed is:

1. A mobile device comprising:
   at least two antennas; and
   a radio frequency front-end including at least two transmit chains, each of the transmit chains including a power amplifier configured to amplify a radio frequency signal and transmit the amplified radio frequency signal via a corresponding one of the at least two antennas, the amplified radio frequency signal has a power less than a threshold power level at each of the antennas, the radio frequency front-end configured to share a channel of an unlicensed band with one or more other radio frequency devices, the channel being split into a plurality of monolithic blocks corresponding to the front-end and the one or more other radio frequency devices such that each of the front-end and the one or more other radio frequency devices is configured to use the corresponding monolithic block of the channel of the unlicensed band.

2. The mobile device of claim 1 wherein at least one of the transmit chains is a WiFi transmit chain.

3. The mobile device of claim 1 wherein a combined uplink power of the at least two transmit chains is greater than the threshold power level.

4. The mobile device of claim 1 wherein the at least two transmit chains are further configured to transmit the amplified radio frequency signal with less power back-off compared to a single transmit chain transmitting the radio frequency signal with a power less than the threshold power level.

5. The mobile device of claim 1 wherein the at least two transmit chains include at least four transmit chains each configured to transmit the amplified radio frequency signal, and a combined uplink power of the at least four transmit chains is about 6 dB greater than the threshold power level.

6. The mobile device of claim 5 wherein the at least two antennas include four antennas, and each of the four transmit chains are configured to transmit the amplified radio frequency signal via a corresponding one of the four antennas.

7. A method of using a radio frequency device comprising:
   receiving a radio frequency signal at a radio frequency front end including at least two transmit chains of a radio frequency device, each of the transmit chains including a power amplifier;
   independently amplifying the radio frequency signals using each of the power amplifiers;
   transmitting the amplified radio frequency signals via at least two antennas respectively coupled to the at least two transmit chains, each of the transmitted amplified radio frequency signals having a power less than a threshold power level at each of the antennas; and
   sharing, using the radio frequency front end, a channel of an unlicensed band with one or more other radio frequency devices, the channel being split into a plurality of monolithic blocks corresponding to the radio frequency front end and the one or more other radio frequency devices such that each of the radio frequency front end and the one or more other radio frequency devices is configured to use the corresponding monolithic block of the channel of the unlicensed band.

8. The method of claim 7 wherein at least one of the transmit chains is a WiFi transmit chain.

9. The method of claim 7 further comprising transmitting the radio frequency signal via the at least two transmit chains with less power back-off compared to a single transmit chain transmitting the amplified radio frequency signal with a power less than the threshold power level.

10. The method of claim 7 wherein a combined uplink power of the at least two transmit chains is greater than the threshold power level.

11. The method of claim 7 herein the at least two transmit chains include four transmit chains configured to transmit the radio frequency signal, and a combined uplink power of the four transmit chains is about 6 dB greater than the threshold power level.

12. A radio frequency device comprising:
   front-end circuitry including at least two transmit chains, each of the transmit chains configured to transmit an amplified radio frequency signal via a corresponding one of at least two antennas, the amplified radio frequency signal having a power less than a threshold power level at each of the transmit chains, the front-end circuitry configured to share a channel of a frequency band with one or more other radio frequency devices, the channel being split into a plurality of monolithic blocks corresponding to the front-end circuitry and the one or more other radio frequency devices such that each of the front-end circuitry and the one or more other radio frequency devices is configured to use the monolithic block of the channel of the frequency band.

13. The device of claim 12 wherein each of the transmit chains includes a power amplifier configured to generate the amplified radio frequency signal.

14. The device of claim 12 wherein at least one of the transmit chains is a WiFi transmit chain.

15. The device of claim 12 wherein a combined uplink power of the at least two transmit chains is greater than the threshold power level.

16. The device of claim 12 wherein the at least two transmit chains are further configured to transmit the amplified radio frequency signal with less power back-off compared to a single transmit chain transmitting the radio frequency signal with a power less than the threshold power level.

17. The device of claim 12 wherein the at least two transmit chains include at least four transmit chains each configured to transmit the amplified radio frequency signal, a combined uplink power of the four transmit chains is about 6 dB greater than the threshold power level.

18. The device of claim 17 wherein each of the four transmit chains are configured to transmit the amplified radio frequency signal via a corresponding one of at least four antennas.

19. The device of claim 12 wherein the frequency band is an unlicensed band.

20. A front-end module including the radio frequency device of claim 12.

\* \* \* \* \*